May 12, 1970 J. H. SHERRILL ET AL 3,511,122
LEAVES AND APPARATUS FOR CUTTING STACKED TOBACCO LEAVES
Filed July 12, 1967 10 Sheets-Sheet 1

INVENTORS
JOSEPH H. SHERRILL
JESSE R. PINKHAM
BY
Lester H. Clark
ATTORNEY

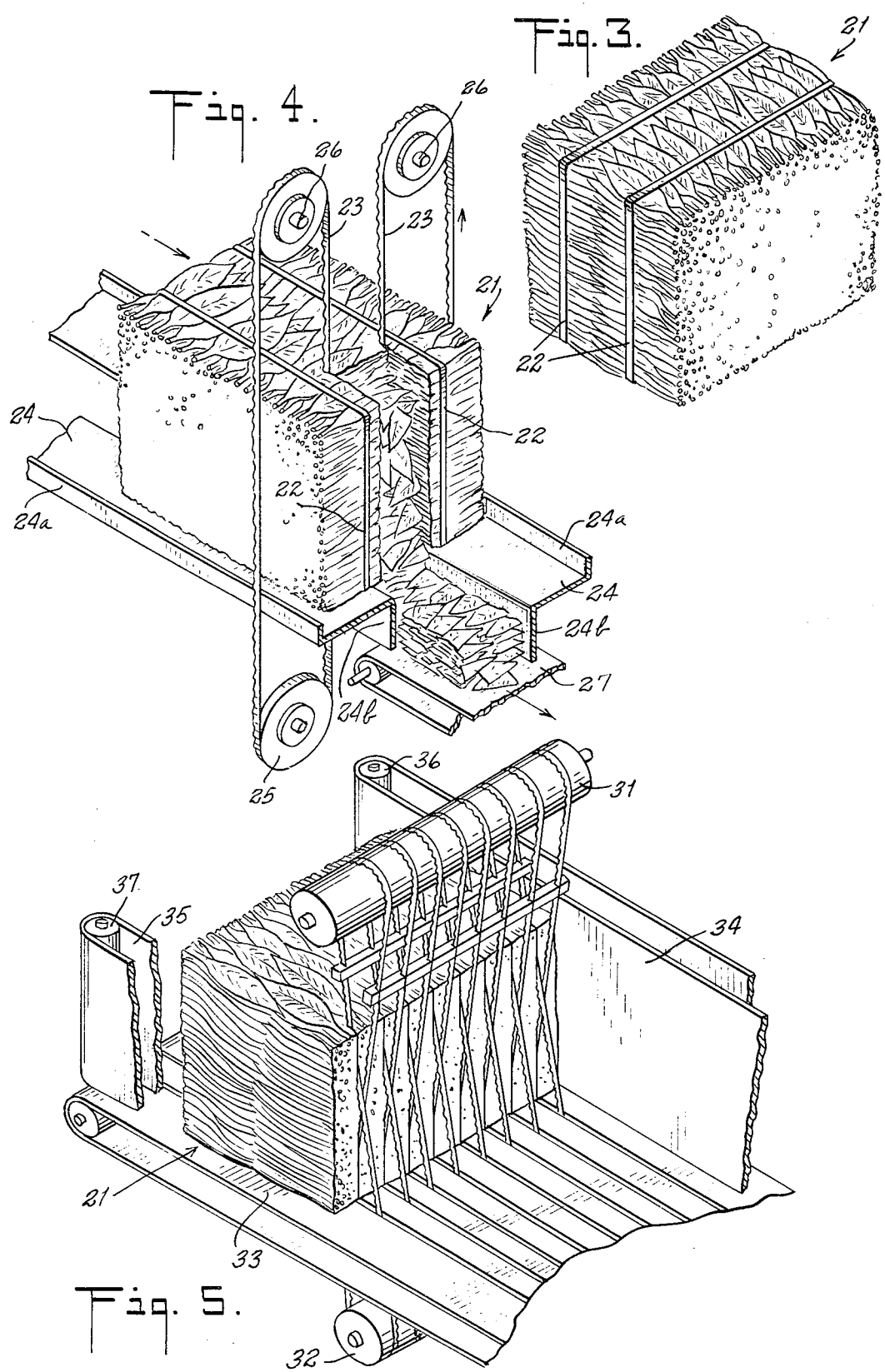

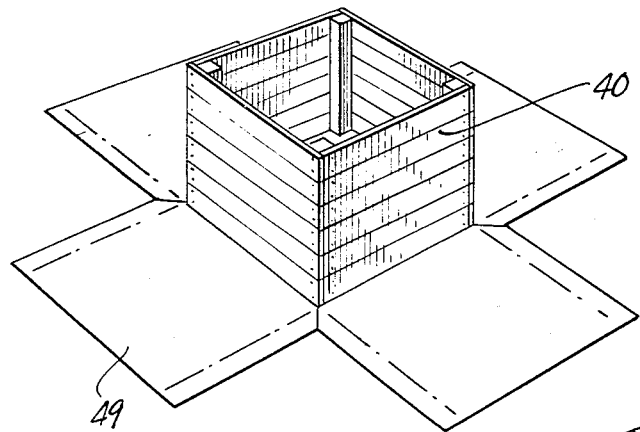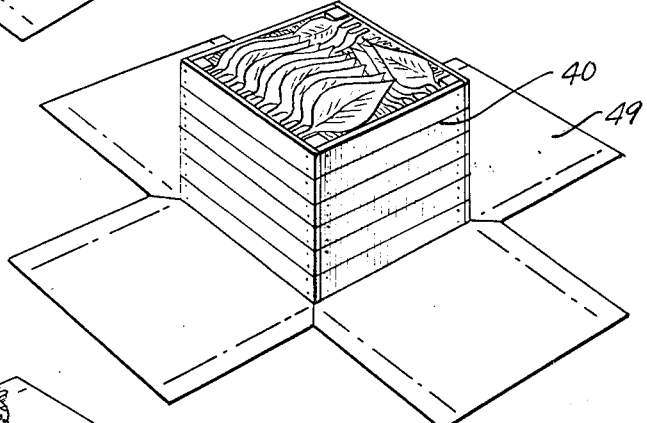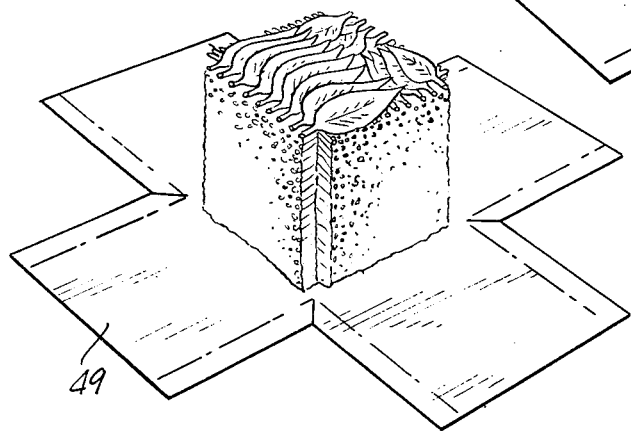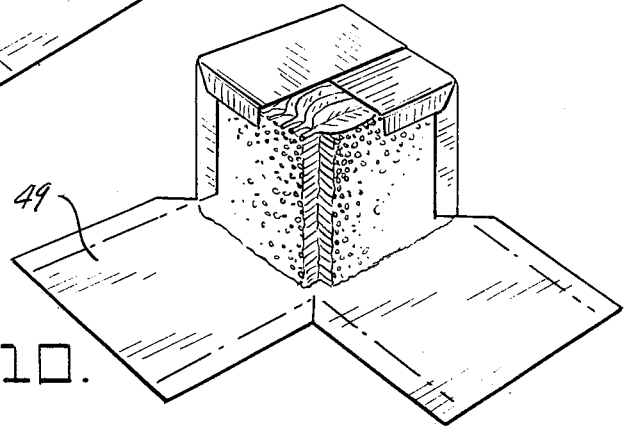

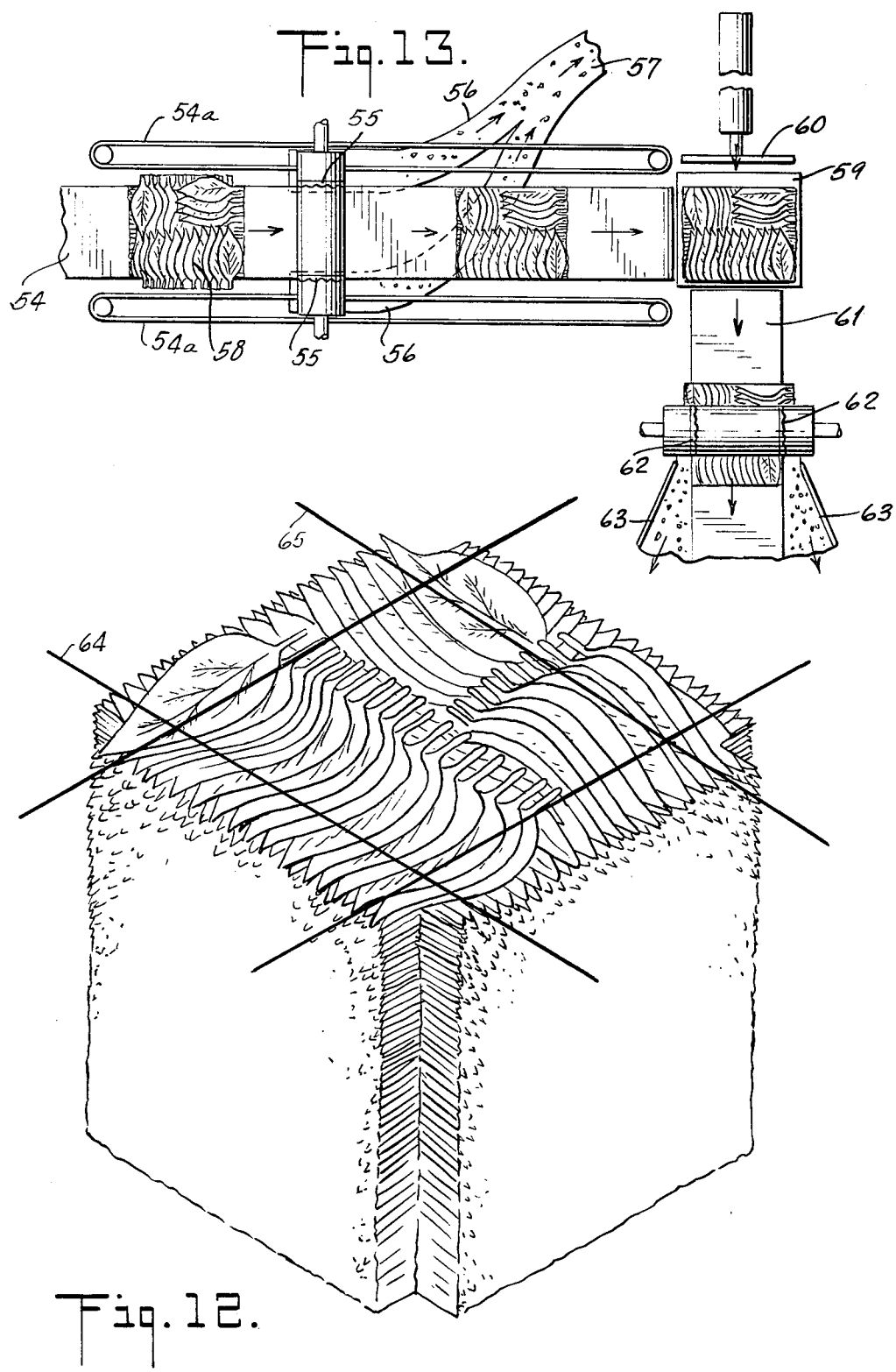

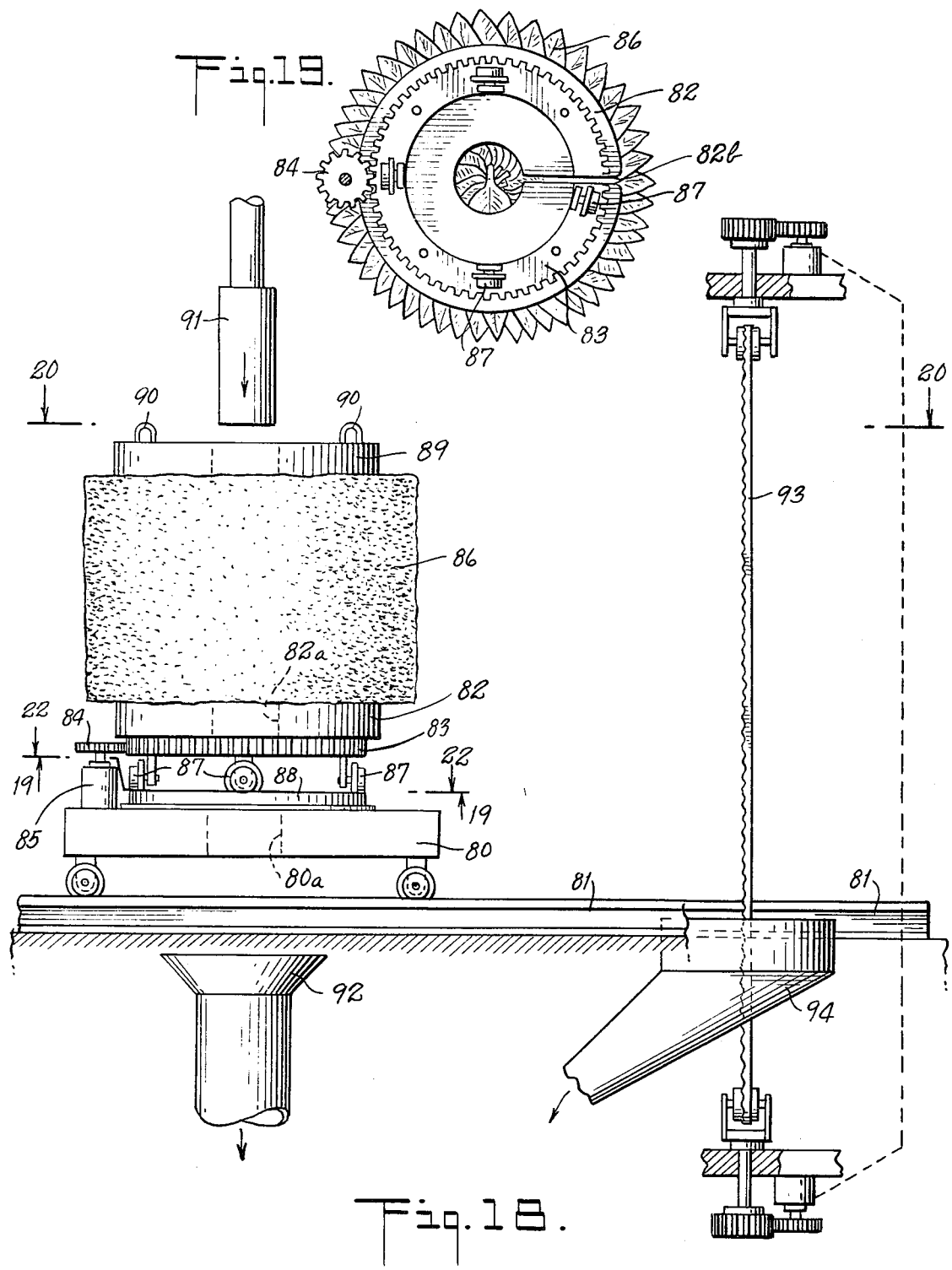

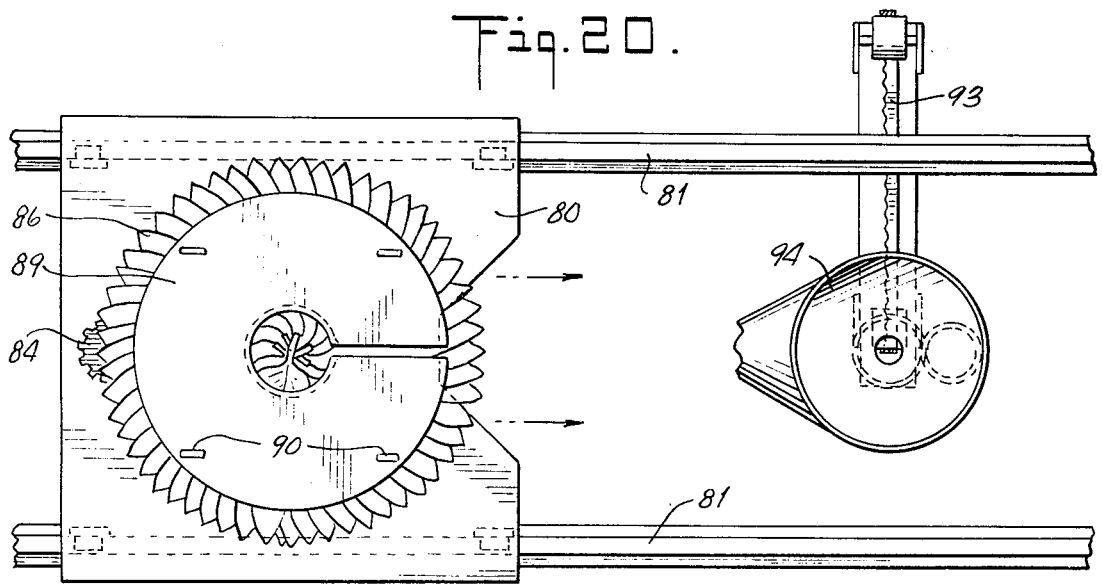
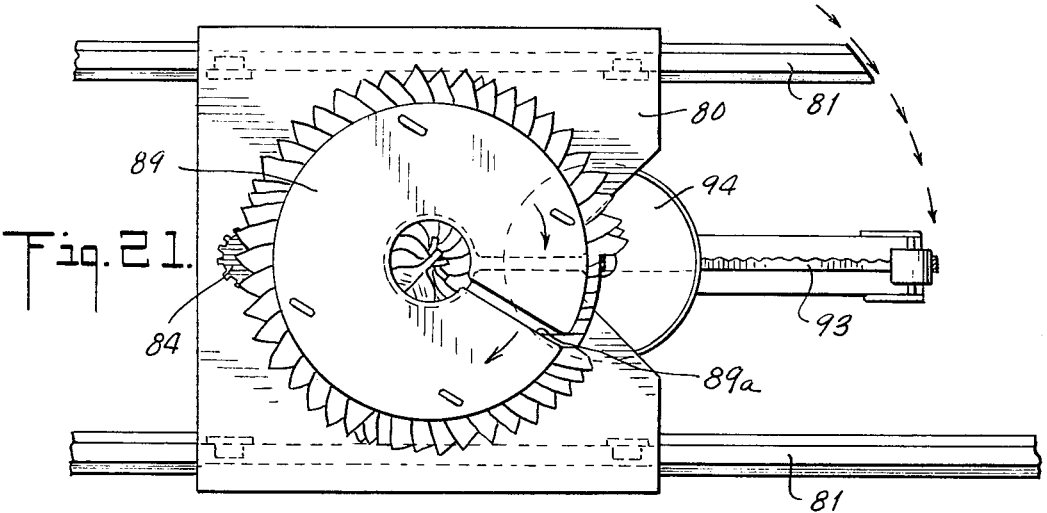
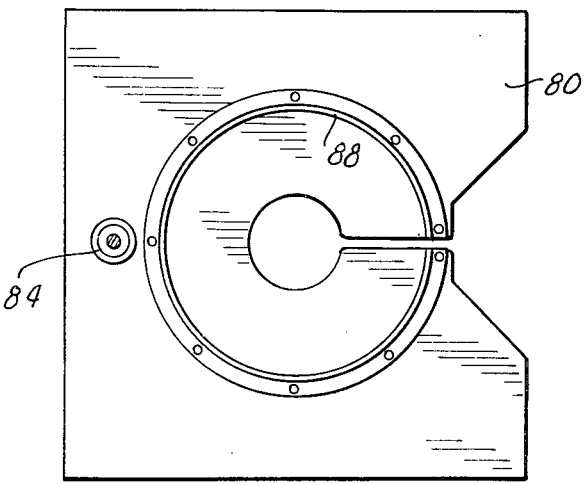

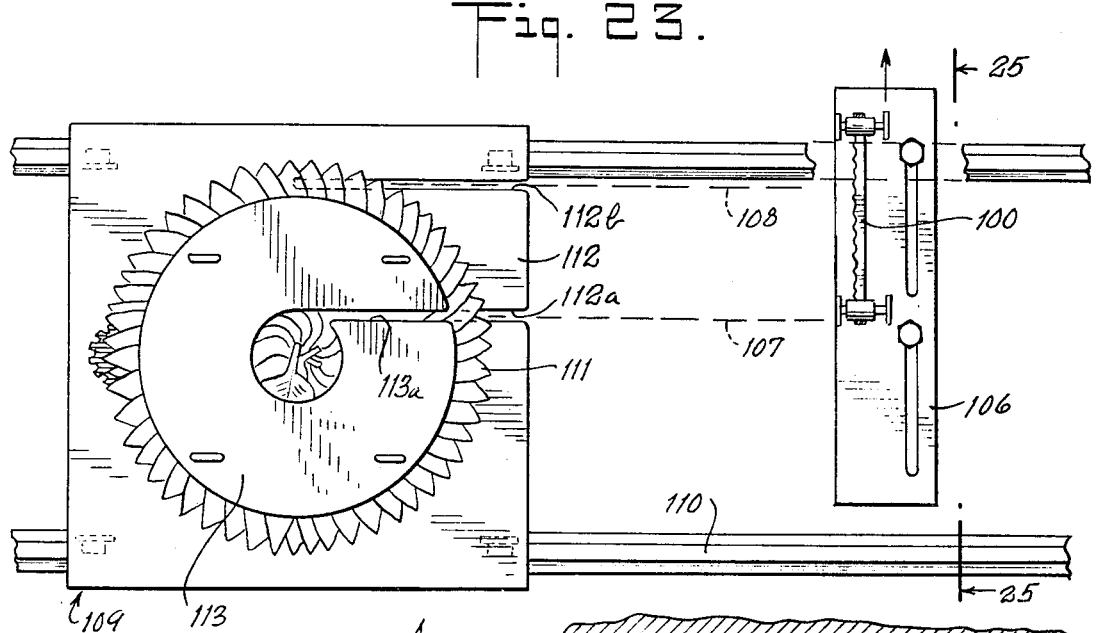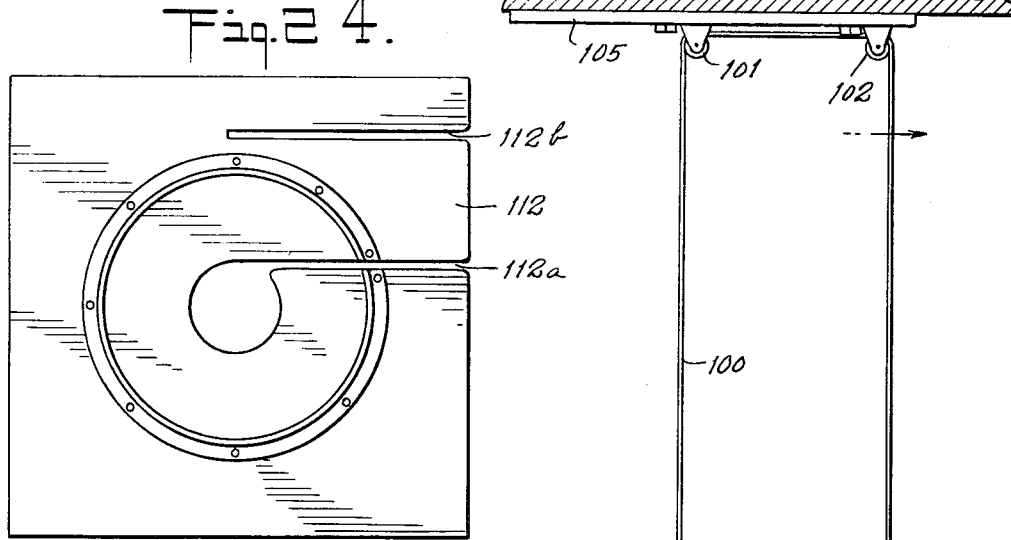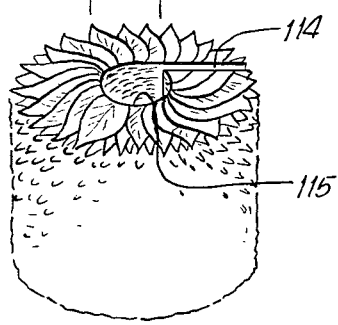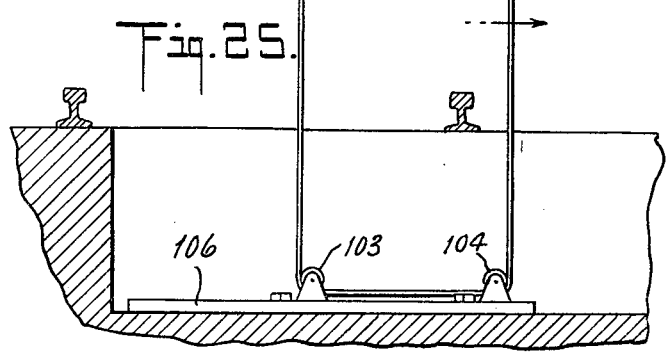

United States Patent Office 3,511,122
Patented May 12, 1970

3,511,122
LEAVES AND APPARATUS FOR CUTTING
STACKED TOBACCO LEAVES
Joseph H. Sherrill and Jesse R. Pinkham, Winston-Salem,
N.C., assignors to R. J. Reynolds Tobacco Company,
Winston-Salem, N.C., a corporation of New Jersey
Filed July 12, 1967, Ser. No. 652,778
Int. Cl. B26d 1/50, 7/06
U.S. Cl. 83—155                                    3 Claims

ABSTRACT OF THE DISCLOSURE

Methods and apparatus for stacking tobacco leaves and cutting the stacks of leaves. Leaves in stack may be randomly oriented, and such stacks are moved through a row of parallel blades to cut the leaves into random strips. Alternatively, the stack may be arranged as a cube or cylinder, with leaves oriented so that like ends (either stems or tips) define outer surface of cube or cylinder. Such oriented stacks are cut by a single blade or by two parallel blades, cuts being made parallel to outer surfaces of cubic stacks or concentric with outer surfaces of cylindrical stacks. Such cuts separate like ends from other parts of leaves. Separated ends are carried away from cutting station by one conveyor means and other parts by another conveyor means.

BACKGROUND OF THE INVENTION

This invention relates to initial processing of cured tobacco leaves for the purpose of making them into tobacco products, which may be, for example, smoking tobacco, cigarettes, cigars, chewing tobacco and snuff.

The initial processing of tobacco leaves as conventionally practiced comprises the removal of the stems and tips and cutting of the mid-section of the leaf into strips. These operations are commonly carried out in a section of the tobacco processing plant known as the stemmery.

In the past, most tobacco has arrived at the stemmery in "hands." Each hand consists of a plurality of leaves oriented in the same direction so that their stems project. Another leaf of tobacco is wrapped around the projecting butt ends of the stems. The hands are assembled by the tobacco farmer when the tobacco is prepared for curing. Assembly of the tobacco in hands is necessary for conventional curing methods.

More recently, because of the increasing cost and scarcity of hand labor, other curing practices have come into vogue, some of which receive the tobacco in stacks in which the leaves are all oriented in the same direction, but not tied. In some cases, the leaves are simply stacked without being oriented and are then termed "loose leaves." In other cases, the leaves are not stacked at all and are then termed "tangled leaves."

In the conventional stemmery operation, the leaves are either handled individually or in small bunches, whether manually or by machine. The tip ends of the leaves are first cut off and separated from the remainder of the leaf, since those tip ends contain little or no coarse stem structure. The stem butts are then cut off the leaves and are directed through further processing. The mid-section of the leaf, between the tip and the stem, consists of stem portions of more or less thickness, to which are attached thin leaf portions, commonly termed the "lamina." These mid-sections are put through hammer mills to break the lamina away from the stems, and the resulting mixture is then put through an air separator which removes the stems. The lamina from the air separator is then mixed with the tips which were originally cut off while the stem portions from the hammer mills join the stem butts for further treatment. Several cycles of hammer mills and air separators may be employed. At the end of each cycle, some clear lamina is removed and some stems are removed. The remainder, consisting of stems with lamina attached, move on to the next milling and separating cycle.

The initial processing methods previously used have been particularly adapted to the treatment of tobacco arriving in conventional hands. Where the tobacco arrives at the stemmery as either loose or tangled leaves, there is a considerable amount of hand labor involved if the leaves are to be separated to go through the stemmery in the conventional manner. As an alternative, the entire loose or tangled leaf can be put through the hammer mill. However, this involves increasing the amount of hammer mill capacity available, since those mills must handle not only the mid-section of the leaf but also the tips and stem butts which would otherwise not go through them. Furthermore, the yield of strips of the size for good filling capacity is reduced by not tipping.

The objects of this invention are: (1) a method for bulk tipping; (2) a method for cutting tobacco leaves with a clean cut, which helps to eliminate the fines; and (3) a method for separating clear lamina from lamina with attached stems in order to reduce further the amount of leaf going through the hammer mill.

BRIEF SUMMARY OF THE INVENTION

This invention relates to apparatus and methods of handling and cutting tobacco leaves and includes novel methods of stacking such leaves and novel apparatus for cutting the stacked leaves.

The leaves may be arranged in stacks in the form of a parallelepiped with like ends of the leaves oriented toward either two or possibly all four vertical sides of the parallelepiped. The like ends which are directed toward the sides may be either the stems or the tips. The horizontal dimension of the stack, in the direction of the stem, should be substantially equal to the sum of two leaf lengths.

Another form of stack is cylindrical and has a diameter substantially equal to the sum of the lengths of two leaves. The leaves may be placed in such a stack either with their tips pointed inwardly and their stems outwardly, or vice versa. The leaves may be arranged radially with respect to the cylindrical stack or they may be set at angles to the radii.

One form of apparatus described herein is adapted to handle the parallelepiped form of stock. This apparatus comprises two parallel cutter blades arranged to cut the stack while the leaves are held firmly in stacked relation. The blades may either cut the stems or butt ends from the leaves, if the leaves are stacked with the stems outwardly, or the two blades may cut the tips from the leaves, if the leaves are stacked with the tips outward. As an alternative, the two cutter blades may cut a core from the middle portion of the stack removing the ends which appear at the middle of the stack.

Another form of apparatus is adapted to handle cylindrical stacks. Such an apparatus comprises a single blade which moves initially into the stack along either a radius or a secant path and then along a circular path concentric with the periphery of the cylindrical stack. This apparatus may be arranged to trim away the outer portions of the stack, or it may be arranged to cut out the core of the stack.

Another form of apparatus illustrated herein is adapted to handle stacks of loose or disoriented leaves, and cut them into strips.

DESCRIPTION OF THE DRAWINGS

FIG. 3 is a perspective view of a bale of tobacco leaves constructed in accordance with one embodiment of the invention;

FIG. 4 is a perspective view illustrating one form of apparatus for cutting the bale illustrated in FIG. 3;

FIG. 5 is a perspective view illustrating another form of apparatus for cutting the bale of FIG. 3;

FIG. 7 is a perspective view showing the stacking form of FIG. 6 arranged on a bale-wrapping sheet;

FIG. 8 is a perspective view similar to FIG. 7, but showing the form filled with tobacco leaves;

FIG. 9 is a perspective view similar to FIG. 8, but with the form removed, leaving the stack of tobacco on the bale-wrapping sheet;

FIG. 10 is a perspective view similar to FIG. 9, showing the bale-wrapping sheet partially wrapped around the stack;

FIG. 12 is a view similar to FIG. 7, but showing a method of stacking the leaves with their tips outward and a similar pattern for cutting the stack;

FIG. 13 is a somewhat diagrammatic view of apparatus for cutting a stack, as indicated diagrammatically in FIGS. 11 and 12;

FIG. 18 is a somewhat diagrammatic view of an apparatus for cutting a cylindrical stack according to the methods of FIGS. 15–17;

FIG. 19 is a sectional view taken on the line 19—19 of FIG. 18;

FIG. 20 is a sectional view taken on the line 20—20 of FIG. 18;

FIG. 21 is a fragmentary view similar to FIG. 20, but showing the parts in a different position;

FIG. 22 is a plan view of the stack supporting base in the apparatus of FIGS. 18–21;

FIG. 23 is a view similar to FIG. 20, showing a modified form of bale cutting apparatus;

FIG. 24 is a plan view of the stack supporting plate in the apparatus of FIG. 23;

FIG. 25 is a sectional view taken on the line 25—25 of FIG. 19; and

FIG. 26 is a perspective view showing a bale which has been cut in the apparatus of FIGS. 23–25.

FIGS. 1–2

Figure 1:
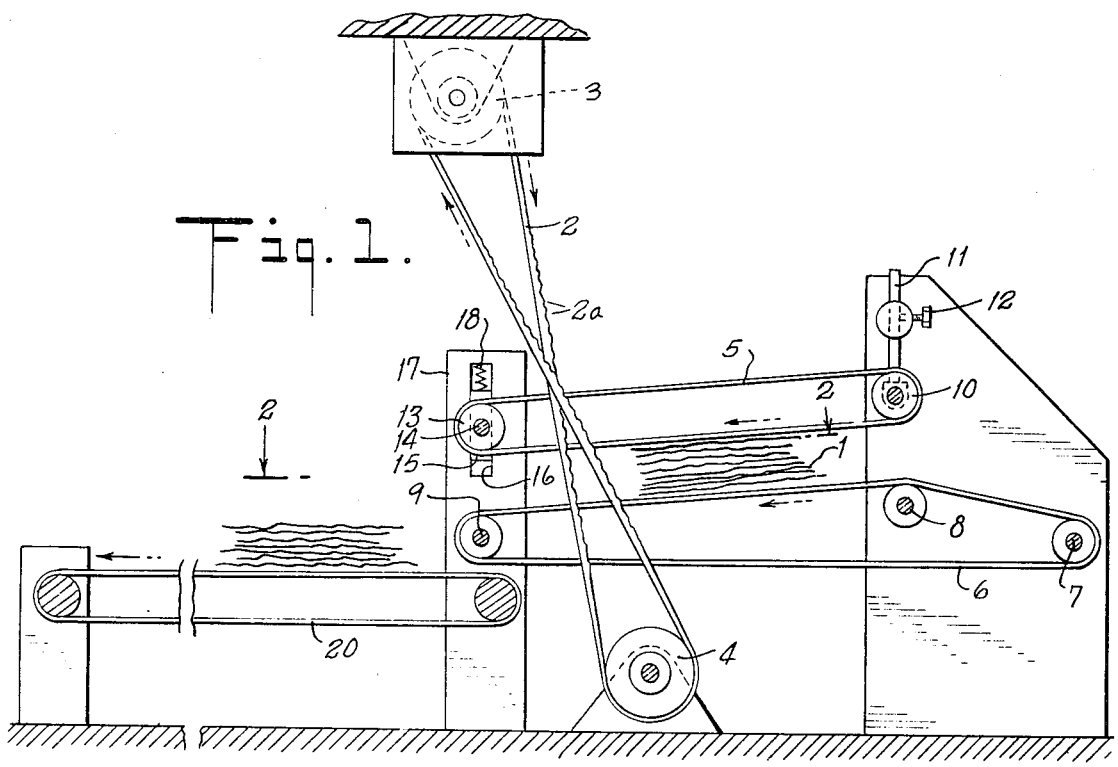
FIG. 1 is a somewhat diagrammatic cross-sectional view taken on the line 1—1 of FIG. 2, showing an apparatus constructed in accordance with the invention for cutting a stack of tobacco leaves of any orientation.

These figures illustrate one form of apparatus according to our invention, which is adapted to handle stacks of tobacco leaves, whether the leaves are aligned with one another of randomly oriented.

The apparatus of these figures comprises a plurality of cutter blades 2, each having a toothed or serrated edge 2a directed toward the right in FIG. 1 and passing over pulleys 3 and 4 rotatably supported above and below the apparatus. The blades 2 move in the direction indicated by the arrows in the drawing and are driven by a suitable motor (not shown) connected to one of the pulleys 3 and 4.

The blade 2 is twisted in a "figure eight" configuration, so that it lies flat against the pulleys 3 and 4, and presents its toothed edge 2a to the tobacco stacks.

The blade 2 may alternatively be driven in the opposite direction to that shown.

A smooth-edged or serrated, i.e., wave-edged, blade is preferred to a sawtoothed blade, since the smooth or serrated blades produce less fines and dust. Instead of the belt-type blades shown, large (5 ft.) diameter, smooth-edged or serrated disc blades may be used.

Stacks of tobacco are fed into the apparatus by a pair of upper and lower conveyor belt means 5 and 6, each comprising a plurality of parallel belts. The lower belt means 6 is supported on three pulleys 7, 8 and 9, rotatable on fixed journals. The reach of the belt means 6 between the pulleys 7 and 8 is inclined slightly upwardly to facilitate loading the stacks of tobacco on the belt means. Between pulleys 8 and 9 the belt means 6 moves along a gradual downward path and between the several saw blades 2.

The horizontal spacing between the blades 2 may be adjusted by suitable mechanism (not shown) of conventional construction. The permissible range of adjustment is limited by the width of the spacing between the individual belts of the conveyor belt means 5 and 6.

The conveyor belt means 5 is shorter than the belt means 6. The entrance end of the belt means 5 is supported on a pulley 10 which is adjustable vertically by suitable mechanism, shown as a rod 11 supporting the axle of the pulley 10, and a set screw 12. Other suitable vertical adjustment means may be used. The opposite end of the belt means 5 passes around a pulley 13 fixed on a shaft 14 which is journaled in a block 15 vertically slidable in a slot 16 located in a vertical support 17. The block 15 is biased downwardly by a spring 18. The spring 18 is effective to hold the conveyor belt means 5 yieldably in contact with the top of the stack 1, so that the stack 1, as it approaches the cutter blades 2 is held firmly at both its top and bottom ends. The blades 2 are effective to slice the stack 1 into a plurality of narrow vertical stacks, so that each leaf in the stack is sliced into strips. The strips after passing through the cutter blades 2 move out from the conveyor means 5 and 6 and onto another conveyor belt 20 which carries them on for further conventional processing, which may, for example, be by means of a hammer mill and an air separator.

Figure 2:
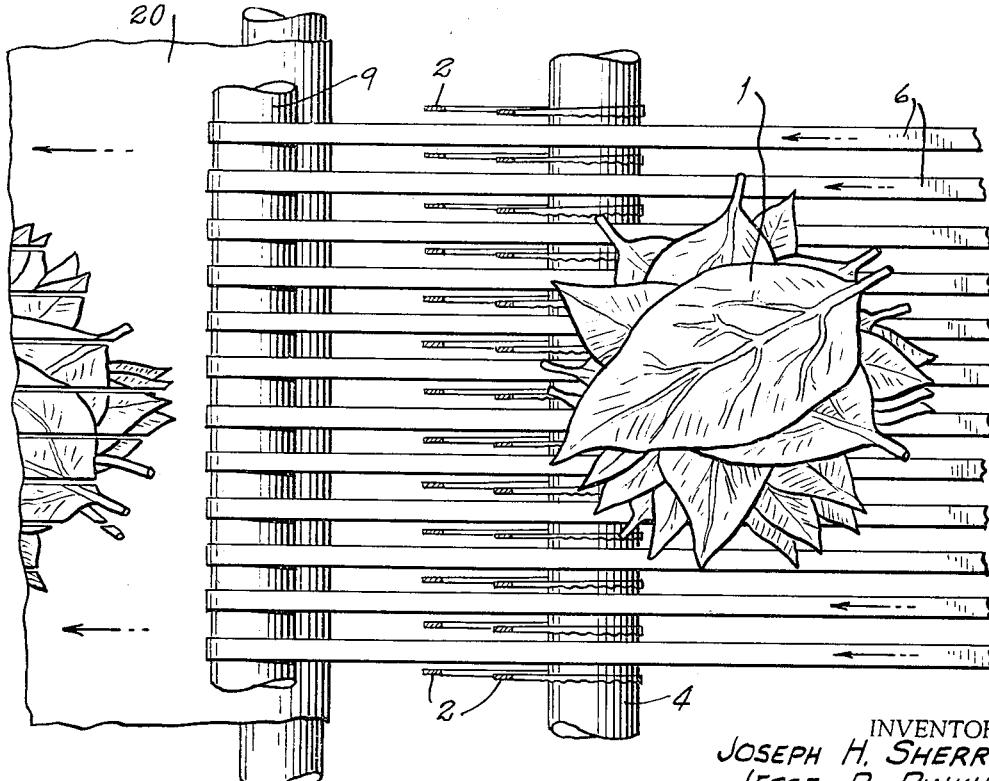
FIG. 2 is a horizontal sectional view taken on the line 2—2 of FIG. 1, on an enlarged scale.

When the apparatus of FIGS. 1 and 2 is handling randomly oriented stacks of leaves, as shown, the entire product moving off the conveyor 20 must be sent through the hammer mill and the air separator. On the other hand, if the stack of leaves is oriented with all their stems in one direction, then the stack may be fed through the cutting apparatus with the stems parallel to the direction of movement, so that the stem sections are in the central parts of the stask as they leave the belts 5 and 6, while the lateral portions of the leaf are at the sides of the conveyor. In that case, the conveyor belt 20 may be constructed to deliver the stacks of strips to apparatus which will divert the side portions of the leaves through a different processing channel than the central portions. The central portions, containing the stem, will require more cycles of hammer mill and air separator operation than the side portions. Lamina without appreciable stem can by-pass the lamina mill entirely.

FIGS. 3–4

FIG. 3 illustrates a bale 21 of tobacco leaves held together by two bands 22. The bale 21 is arranged so that its dimension in a direction perpendicular to the bands 22 is approximately equal to twice the length of one leaf, less the length of one tip, so that the tips overlap along the middle of the bale. The leaves at one side of the bale are oriented in the opposite sense from the leaves at the other side, so that the stem portions of both sets of oppositely directed leaves are located at the opposite sides of the stack.

FIG. 4 illustrates a bale 21 with its hands 22 still in place, being fed by a suitable pusher (not shown) through a cutting apparatus including two continuous cutter blades 23 operating along parallel paths. The side portions of the bale are supported on rails 24 having upwardly projecting flanges 24a at their outer edges and downwardly projecting flanges 24b at their inner edges. The cutter bands 23 extend over the lower pulleys 25 and upper pulleys 26, which are driven by suitable mechanism (not shown). As the central portion of the bale passes between the cutters 23, the tips of the leaves are cut away from the other parts of the bale and fall between the flanges 24b onto a conveyor belt 27 to be delivered for further processing in a conventional manner. These tip portions will require a minimum of hammer mill treatment and may even require none. The remainder of the leaves will be delivered for hammer mill treatent.

FIG. 5

FIG. 5 shows a bale 21 of the type shown in FIG. 3 moving through a multiple band cutting apparatus having a plurality of bands 30 running over an upper pulley 31 and a lower pulley 32. The bale is supported by a set of multiple belts 33 running between the bands 30. A set of side guide belts 34 and 35 are provided running on pulleys 36 and 37 respectively. The bale 21 is pushed by the conveyor belts 33 through the bands 30. The purpose of this apparatus is to sever lamina portion with no stem from lamina portion with stem. The sliced or diced conglomerate output of this apparatus is passed into a separator where those two portions are separated. Only the portion containing the stems then goes to a hammer mill for further action to break lamina away from stem portion.

The bale bands 22 have been removed from the bale before it reached the position of FIG. 5. If necessary, hold down belts or other hold down mechanism corresponding to belts 5 of FIG. 1, may be added.

FIGS. 6–11

Figure 6:
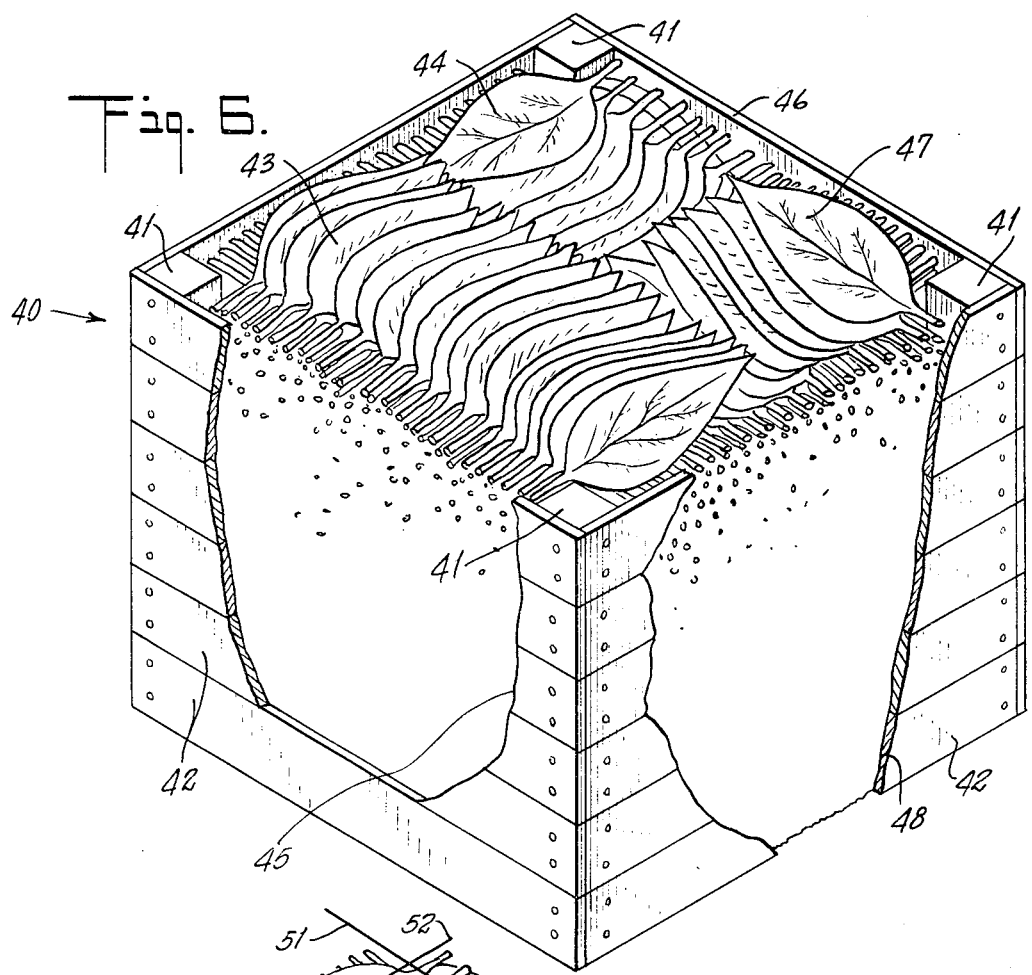
FIG. 6 is a perspective view of one type of stacking form for constructing a bale in accordance with the invention.

FIG. 6 shows a case 40 in which a stack or bale in accordance with the invention may be formed. The case 40 is a simple structure having the form of a rectangular parallelepiped, with vertical posts 41 at each of the four internal corners of the case and sides consisting of wooden strips 42 nailed to the corner posts 41. The tobacco leaves are all placed in the case 40 with their stems directed outwardly toward one of the sides. Different layers may be oriented in different directions, but the stack is so constructed that approximately one-fourth of all the leaves have their stems abutting against each of the four sides of the case. Preferably, in packing, one layer of leaves is placed with their stems outwardly, facing opposite sides of the box, as in the case of the leaves shown at 43 and 44 in FIG. 6. The stems of the leaves 43 abut against the side 45 of the case 40. The stems of the leaves 44 abut against the side 46 of the case 40. The layers above and below the layer 43, 44 are placed with their stems at right angles to the stems in that layer. For example, the layer 47 has its stems abutting against the side 48 of the case 40.

Alternatively, all layers could have their like ends abutting just one pair of opposite sides of the form, as in the case of bale 21 in FIG. 3.

At the start of the filling operation, the case 40, which has no top or bottom closure, is placed on a sheet 49 of burlap or paper or some other suitable sheet material, as shown in FIG. 7. The stack is then formed in the case, as shown in FIG. 8. The case is then lifted upwardly, leaving the stack on the bale-wrapping sheet, as seen in FIG. 9. The four flaps of sheet material may then be drawn over the top of the stack for enclosing the stack as a bale, as illustrated in FIG. 10. The bale may be fastened either by bonding the ends of the sheet material together, or by the use of bale enclosing bands.

The bale may then be shipped or stored as required. When the bale is ready to be processed into tobacco products, the bale cover is removed, leaving the stack of leaves as it appears in FIG. 11. The stack is then moved through suitable cutting apparatus such as that described below in connection with FIG. 13 to make two parallel cuts along the lines 50 and 51 in FIG. 11, thereby cutting the stems off half the leaves. Then another pair of cuts is made, along the lines 52 and 53 in FIG. 11, thereby cutting the stems off the other half of the leaves in the stack. Thus, all the stem portions of the leaves are removed and can be put through a typical stem treating process.

FIG. 12

Figure 11:
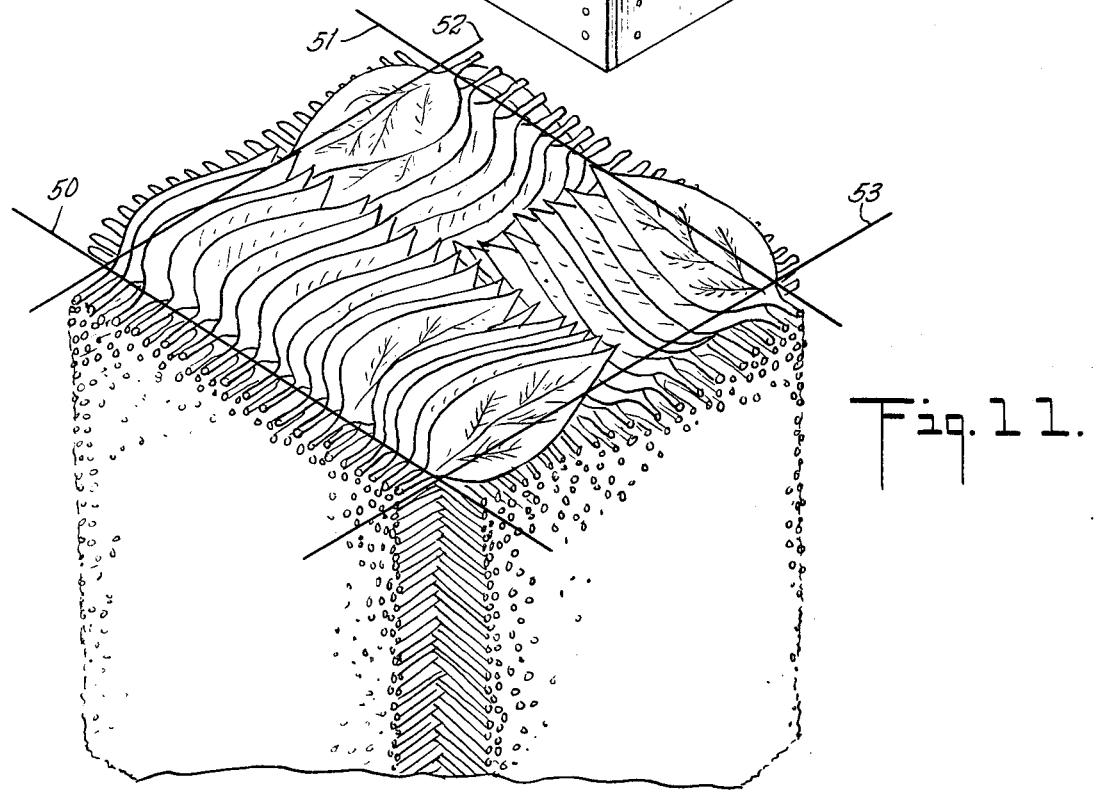
FIG. 11 is a diagrammatic view illustrating a stack of tobacco which has been removed from the form of FIG. 6, and showing a pattern of cuts for removing the stems of the leaves.

Instead of stacking the leaves with their stems out, as shown in FIG. 11, the leaves may be stacked with their tips out, as illustrated in FIG. 12, in which case two sets of parallel cuts 64, 65 and 66, 67 will be effective to remove the tips from all the leaves in the stack.

FIG. 13

This figure illustrates a cutting apparatus for making the cuts 50, 51, 52 and 53 in a stack, as illustrated in FIG. 11. The cutting apparatus of FIG. 13 includes a conveyor 54 which carries stacks of tobacco leaves through a first pair of parallel blades 55 where the cuts 50 and 51 are made. The stem butts fall from the conveyor 54 into discharge chutes 56 which join at 57. The rest of the stack 58 moves along a conveyor 54 and is delivered to a table 59. A pusher, generally indicated at 60, moves the stack off the table 59 onto another conveyor 61 extending at right angles to the conveyor 54. The conveyor 61 carries the stack through another pair of cutters 62 which make the cuts 52 and 53 in the bale removing the stem butts from the other half of the leaves in the stack. The stems fall from the conveyor 61 into discharge chutes 63. The remainder of the bale continues for further processing including additional cuts, if desired. Side guide conveyor belts 54a may be provided alongside the conveyor 54 and also along the conveyor 61, if necessary.

Alternatively, additional cuts can be made at the same time cuts 50 and 51 are made. For example, multiple blades can be used, set on 1½ or 2-inch center distances, so that the product of this apparatus will contain a high proportion of clear lamina severed from the lamina portions containing stems. When this product is then transferred at right angles as in FIG. 13, the operation produces so-called diced leaves. The lamina portions containing stems are then separated by an air separator from the clear lamina portions, and the stem-containing portions are subjected to further treatment.

A similar dicing operation can be applied to the products of the apparatus in FIGS. 1, 2 and 5.

A considerable advantage in dicing is that the leaves are cut with a clean line rather than being torn as in a thrasher or hammer mill. Such torn edges are rough with small projections that break off, causing fines and scraps, the value of which is much less than larger lamina.

FIG. 14

Figure 14:
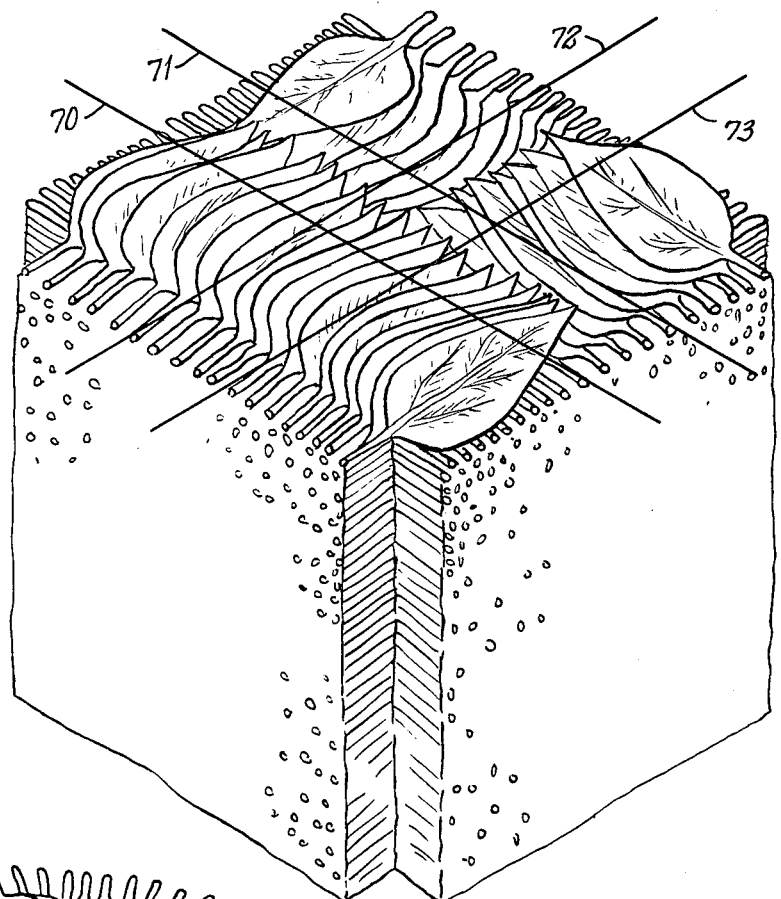
FIG. 14 is a perspective view similar to FIG. 7, but indicating a different manner in which the stack may be cut.

Instead of making the parallel cuts at the outer portions of the stack of FIG. 11 to remove the stems, the cuts may be made near the center of the stack, as shown at 70, 71 and 72, 73 in FIG. 14, to cut off the tips of the leaves. If that is done, the cutting apparatus should be provided with a central discharge conveyor means for carrying away the tips, such as that shown in FIG. 4.

Although the centrally discharged portions, between the cuts 70, 71 and 72, 73 contain a certain proportion of long stems and long parts of leaf, that proportion is small, since those centrally discharged portions contain all the tips and only a small proportion of the long stems and the long leaf parts. Furthermore, by passing the centrally discharged portion through an air separator, the leaf pieces containing stems can readily be removed from the tips. This separation may be made before any hammer milling, so that the tips are not degraded by being passed through a conventional threshing operation.

Alternatively, instead of making the cuts 70, 71 and 72, 73 on the stack with the stem butts attached, as shown, those cuts could be made on the stack after it leaves the apparatus of FIG. 13, and thus has the stem butts removed. While the air separation step would still be necessary to segregate the tips from the long leaf parts the load on the threshing hammer mill would be reduced by the preliminary removal of the stem butts.

FIGS. 15–17

These figures illustrate a form of stack which is built up in a cylindrical tube, which could have a diameter substantially equal to twice the length of an average tobacco leaf minus the length of one tip and should be open at both ends. However the diameter of tobacco cylinders shown in FIGS. 16 and 17 should approach the diameter of a standard tobacco hogshead as presently being used. In some cases the leaves especially short ones would have to be overlapped to get this diameter. After the tube is removed the stack may be wrapped in suitable sheet material for transportation or storage. When the stack is ready for processing this sheet material may be removed and the stack may then be cut on apparatus as illustrated in FIGS. 18 and 22. The first cut should be a radial one as shown at 74 in FIG. 15. After the radial cut is made to a depth determined by the length of the tip portions to be removed the radial cut is followed by a circular cut as shown at 75.

Figure 16:
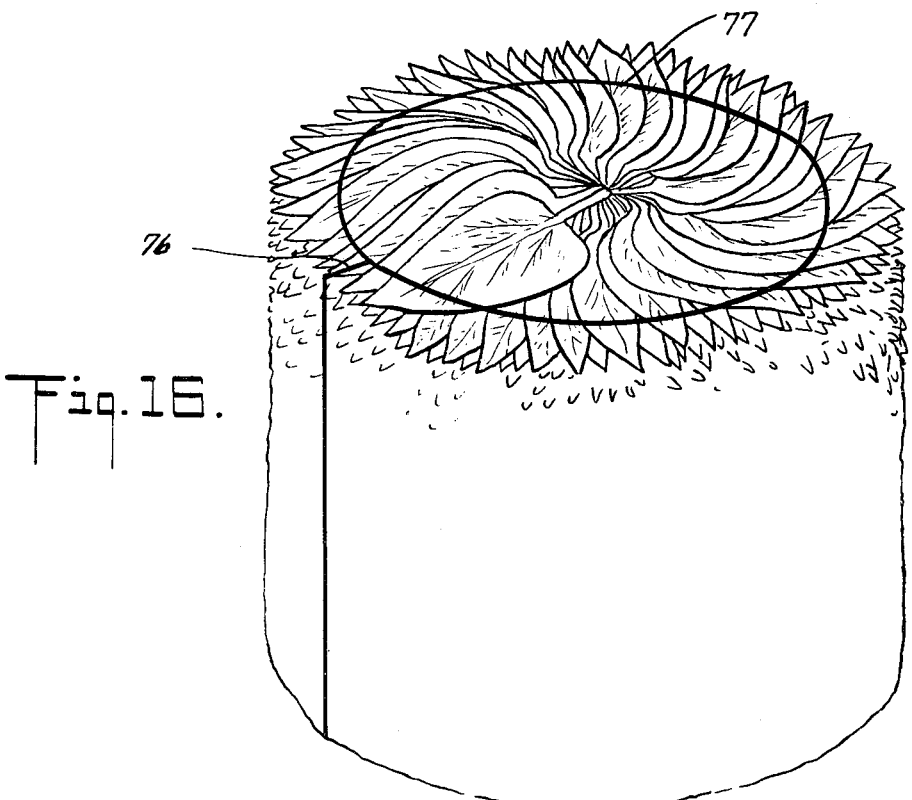
FIG. 16 is a view of another cylindrical stack, with the leaf tips outward, illustrating another method of cutting the bale to remove the tips.

Alternatively, the stack may be formed with the tips out, as sown in FIG. 16, in which case the first radical cut 76 is considerably shorter than the cut 74 and is followed by a circular cut 77 of considerably larger diameter than the circular cut 75.

Figure 17:
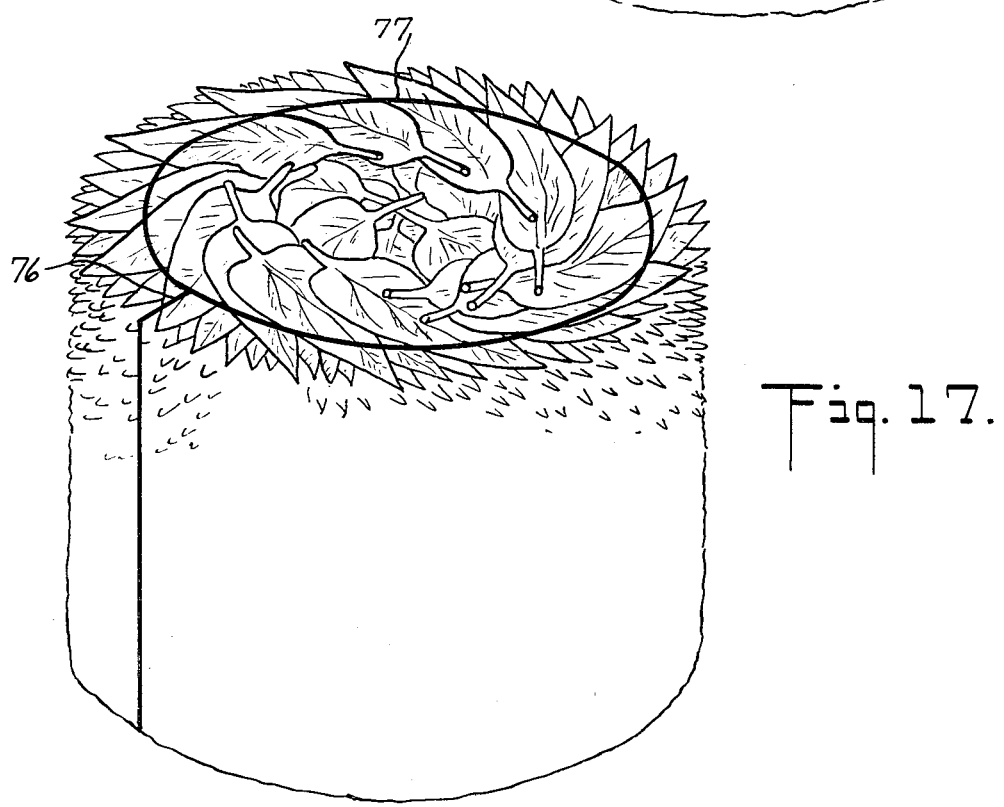
FIG. 17 is a perspective view illustrating still another method of stacking tobacco leaves in a cylindrical stack with their tips outward, and a method for cutting the stack.

Instead of having the central veins of the leaves radial, as shown in FIG. 16, the veins may extend at an angle to the radii of the cylindrical stack, as shown in FIG. 17. In this case, the cuts 76 and 77 would be the same as in th case of FIG. 16.

Figure 15:
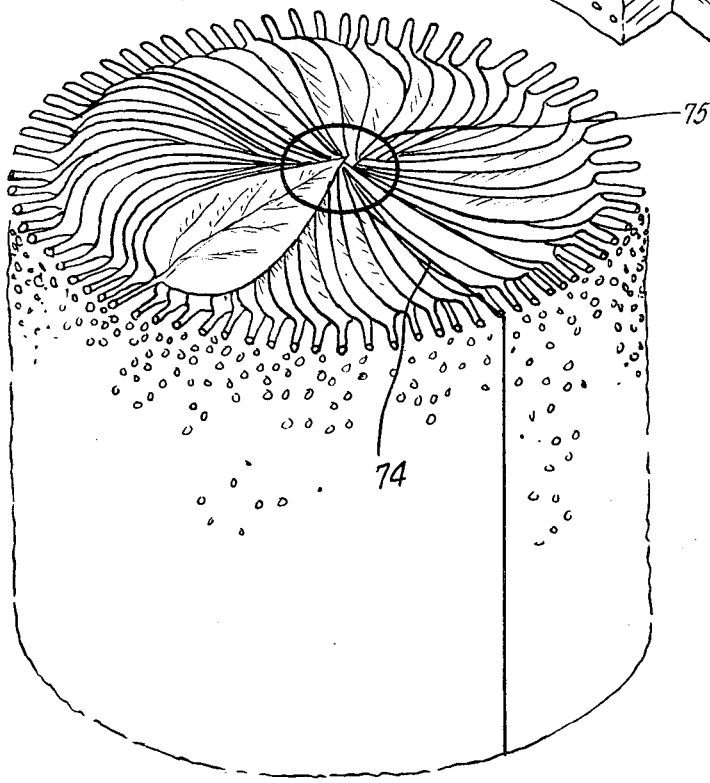
FIG. 15 is a perspective view of a cylindrical stack, with the stem butts outward, and illustrating one method of cutting the stack.

The stacks of FIGS. 15 and 16 may be cut to remove the stems first instead of the tips. Alternatively, the stems and tips may be cut simultaneously in a suitable apparatus. The stacking arrangement of FIG. 17 does not lend itself to cutting the stems as does the stacking arrangement of FIGS. 15 and 16. Nevertheless, the arrangement of FIG. 17 uses the space within the cylindrical tube more efficiently, and it is possible with that arrangement to pack a greater weight of tobacco in a stack or bale of given height, than in the stacks of FIGS. 15 and 16, using standard hogshead.

FIGS. 18–22

These figures illustrate apparatus for making the radial and circular cuts illustrated in connection with the stacks of FIGS. 11–13. This apparatus includes a carriage 80 movable along a track 81 and supporting a base 82 having a gear 83 attached to its under side and cooperating with a smaller gear 84 driven by a motor 85. A stack 86 of tobacco leaves is placed on the rotatable base 82. The base 82 is supported on wheels 87 running on a circular track 88 on the carriage 80. The carriage 80 is provided with a central circular opening 80a and the base 82 is similarly provided with a central circular opening 82a. The top of the stack 86 is held firmly down by a weight 89 provided with upwardly projecting yokes 90 by which it may be lifted. A pusher 91 is located above the carriage 80 in the position shown in FIG. 18 and a discharge hopper 92 is located below the carriage, in alignment with the openings 80a and 82a.

A bale to be cut is first loaded on the base 82 when the carriage is in the position illustrated in FIG. 18. The carriage 80 is then driven along the track 81 to bring the bale into engagement with a cutter band 93, which is effective to make a radial cut. The band 93 moves through a slot 82b in the base 82 and a cooperating slot 89a in the weight 90. After the cutter band 90 reaches the required radial depth in the base 82, the cutter band is rotated by turning its supporting mechanism through 90°, e.g., from the position shown in FIG. 18 to the position shown in FIG. 21. The motor 85 is then started and run until the base 82 has traveled through 360°, thereby completing a circular cut in the stack. It may be seen that the apparatus in these figures may be used to make either the outer circular cut 77 of FIGS. 16 and 17, or the inner circular cut 75 of FIG. 15. Where the outer circular cut is made, the leaves or tips which are thereby removed fall readily away from the stack and into a hopper 94 located below the band 93.

Where the cut made is an inner circular cut 75, the tips do not fall freely away from the stack. In that case, the cutter band is turned to its original angular position and retracted from the stack by moving the carriage back along the track 81 to the position shown in FIG. 18. The pusher 91 is then actuated to force the cut-out central portion of the stack downwardly through the openings 82a and 80a into the hopper 92.

Thus, the peripheral portions of the stack 86 are cut away and delivered into the hopper 94, while the central portion is cut away and delivered into the hopper 92. The remaining intermediate portion of the stack may then be removed from the base 82 and delivered to the usual hammer mill and air separator operations.

FIGS. 23–26

These figures illustrate a modified form of the apparatus shown in FIGS. 18–22, in which the initial cut into the periphery of the bale is made in a direction tangential to the circular cut. This has the advantage of simplifying the cutting apparatus, and particularly the manipulation of the cutter blade.

There is shown in FIGS. 23–25 a cutter blade 100 movable over upper pulleys 101, 102 and lower pulleys 103, 104, any one of which may be driven by a suitable motor (not shown). The upper pulleys 101, 102 are mounted on a plate 105 and the lower pulleys 103, 104 are mounted on a plate 106. The plates 105 and 106 are shiftable from the positions shown in full lines, where the cutting edge of the blade 100 is aligned with the dotted line 107 in FIG. 23 to a position where the cutter blade is aligned with the dotted line 108. A carriage 109 moves along a track 110 to carry a stack of tobacco leaves 111 into contact with the cutter blade 100. The carriage 109 is similar to the carriage 80 of FIG. 14, except that the base 112 on the carriage 109 is provided with two slots 112a and 112b. The slot 112a is aligned with the dotted line 107 in FIG. 23 and with a slot 113a in a cover weight 113, which is otherwise similar to the cover weight 89 of FIG. 14.

When the parts are in the positions shown in FIG. 23, and the carriage 109 is moved to the right, the blade 100 makes a straight cut, as illustrated at 114 in FIG. 22. At its inner end, this cut is tangential to an inner circular cut 115. When the carriage 100 has traveled to the point of tangency cuts 114 and 115, the carriage is stopped and the motor on the carriage is started to rotate the base 112 through 360° to complete the cut 115. The blade may then be retracted through the slots 112a and 113a by driving the carriage back along the track 110. When it is desired to cut away the peripheral material from the stack 111 rather than the central material, then the plates 105 and 106 are shifted to bring the blade 100 into alignment with the slots 112b, and the carriage is driven to the right as before. When the blade reaches the inner end of the slot 112b, the motor on the carriage 109 is again started to rotate the stack and thereby cut away the peripheral material which drops into a discharge hopper such as that shown at 94 in FIG. 15.

Alternatively, two cutter blades could be used to make the peripheral cut simultaneously with the inner cut. The core material separated by the inner cut, would have to be separated from the bale by a pusher such as that shown at 91 in FIG. 18. Thus, even though the cuts were made simultaneously or separately, the core material would be separated from the peripheral material.

While we have shown and described certain preferred embodiments of our inventiton, other modifications thereof will readily occur to those skilled in the art, and we therefore intend our invention to be limited only by the appended claims.

What is claimed is:

1. Apparatus for cutting stacks of horizontally disposed, superimposed tobacco leaves, comprising:
    (a) a plurality of parallel, vertically extending blades having cutting edges longer than the vertical dimensions of the stacks;
    (b) means for moving the blades vertically;
    (c) first conveyor means including a plurality of endless belts extending at an angle to the vertical and between the blades for supporting the stack for movement along a cutting reach of the conveyor belt means between a stack supply station and a stack discharge station;
    (d) second conveyor means including a second plurality of parallel endless belts extending at an angle to the vertical and between the blades; and
    (e) means supporting said second conveyor means above said first conveyor means for engagement with the top of a stack moving along said cutting reach; wherein the improvement comprises:
    (f) means in said supporting means at the entrance end of the cutting reach for varying the vertical spacing between the second conveyor means and the first conveyor means to accommodate stacks of different heights;
    (g) means in said supporting means at the exit end of the cutting reach biasing the second conveyor means downwardly to hold the stack firmly at its top and bottom ends as it passes the blades.

2. Apparatus as defined in claim 1, in which:
    (a) said cutting reach slopes downwardly from the stack supply station; and
    (b) said first conveyor means includes, at said stack supply station, an upwardly inclined entrance reach for conveying a stack to the entrance end of the cutting reach.

3. Apparatus as defined in claim 1, including common discharge conveyor means for all of the tobacco cut by said multiplicity of blades, so that the apparatus is adapted to receive and cut stacks of randomly oriented tobacco leaves.

References Cited

UNITED STATES PATENTS

| | | | |
|---|---|---|---|
| 2,225,600 | 12/1940 | Kottmann | 83—201 |
| 2,726,719 | 12/1955 | Marcalus | 83—201 |
| 2,755,856 | 7/1956 | Clemens | 83—201 |
| 2,759,483 | 8/1956 | Slovic | 131—126 |
| 2,984,276 | 5/1961 | Eissmann | 131—145 X |
| 3,078,893 | 2/1963 | Drong | 83—201 |

JAMES M. MEISTER, Primary Examiner

U.S. Cl. X.R.

83—201.12, 422, 435

UNITED STATES PATENT OFFICE
CERTIFICATE OF CORRECTION

Patent No. 3,511,122                    Dated  May 12, 1970

Inventor(s)   Joseph H. Sherrill and Jesse R. Pinkham

It is certified that error appears in the above-identified patent and that said Letters Patent are hereby corrected as shown below:

The title should read -- METHOD OF PACKING, BALING AND CUTTING TOBACCO LEAVES AND APPARATUS FOR CUTTING STACKED TOBACCO LEAVES --.

Column 4, line 59 "stask" should read -- stack --.

Column 7, line 44 "th" should read -- the --.

Column 8, line 49 "23" should read -- 19 --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents

FORM PO-1050 (10-69)